(12) United States Patent
Song et al.

(10) Patent No.: US 7,265,791 B2
(45) Date of Patent: Sep. 4, 2007

(54) METHOD AND APPARATUS FOR DE-INTERLACING VIDEO SIGNAL

(75) Inventors: Byung-cheol Song, Gyeonggi-do (KR); Kang-wook Chun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 10/670,778

(22) Filed: Sep. 26, 2003

(65) Prior Publication Data

US 2004/0125231 A1    Jul. 1, 2004

(30) Foreign Application Priority Data

Dec. 30, 2002    (KR) .................. 10-2002-0087148

(51) Int. Cl.
*H04N 7/01* (2006.01)
*H04N 11/20* (2006.01)

(52) U.S. Cl. .................. 348/448; 348/452; 348/451; 348/700; 348/701

(58) Field of Classification Search .............. 348/448, 348/452, 441, 451, 459, 431.1, 620, 669, 348/699, 700, 701, 910; 382/107, 236; 375/240.16; 386/131
See application file for complete search history.

(56) References Cited

U.S. PATENT DOCUMENTS

| | | | | |
|---|---|---|---|---|
| 5,021,870 A | * | 6/1991 | Motoe et al. ............... | 348/451 |
| 5,488,421 A | * | 1/1996 | Hwang et al. .............. | 348/448 |
| 5,519,451 A | * | 5/1996 | Clatanoff et al. .......... | 348/606 |
| 5,521,644 A | * | 5/1996 | Sezan et al. ................ | 348/452 |
| 5,579,054 A | * | 11/1996 | Sezan et al. ................ | 348/452 |
| 5,689,305 A | * | 11/1997 | Ng et al. ................ | 375/240.15 |
| 5,943,099 A | * | 8/1999 | Kim ............................ | 348/448 |
| 5,959,681 A | * | 9/1999 | Cho ............................ | 348/452 |
| 5,995,154 A | * | 11/1999 | Heimburger ................ | 348/448 |
| 6,414,719 B1 | * | 7/2002 | Parikh ........................ | 348/448 |
| 6,459,455 B1 | * | 10/2002 | Jiang et al. ................. | 348/452 |

(Continued)

FOREIGN PATENT DOCUMENTS

CN    1173776    2/1998

(Continued)

OTHER PUBLICATIONS

Office Action dated Mar. 25, 2005 of the Chinese Patent Application No. 01348463.8.

*Primary Examiner*—David Ometz
*Assistant Examiner*—Jean W. Désir
(74) *Attorney, Agent, or Firm*—Staas & Halsey, LLP (57) ABSTRACT

A three-dimensional de-interlacing method and apparatus for converting an interlaced scan format image into a progressive scan format image by performing low pass filtering on respective predetermined pixels of a current frame and a previous frame and determining pixel motion index values by comparing a threshold value to a difference value between the respective filtered pixels in a current field in one of the current and previous frames and corresponding respective filtered pixels in preceding and succeeding fields to the current field and in the current and previous frames. A motion mode of a pixel is determined based upon the determined motion index values of temporally and spatially adjacent pixels to the pixel. A spatial interpolation or temporal interpolation on the subjected pixel is selected depending on the determined motion mode.

16 Claims, 6 Drawing Sheets

U.S. PATENT DOCUMENTS

| | | | |
|---|---|---|---|
| 6,509,930 B1 * | 1/2003 | Hirano et al. | 348/452 |
| 6,630,961 B1 * | 10/2003 | Shin et al. | 348/448 |
| 6,822,691 B1 * | 11/2004 | Kim et al. | 348/452 |
| 6,900,846 B2 * | 5/2005 | Lee et al. | 348/459 |
| 6,940,557 B2 * | 9/2005 | Handjojo et al. | 348/452 |
| 7,042,512 B2 * | 5/2006 | Yang et al. | 348/452 |
| 7,095,445 B2 * | 8/2006 | Kim et al. | 348/448 |
| 7,098,957 B2 * | 8/2006 | Kim et al. | 348/452 |
| 2002/0080284 A1 | 6/2002 | Kim et al. | 348/700 |
| 2002/0136305 A1 | 9/2002 | Kim et al. | 375/240.17 |

FOREIGN PATENT DOCUMENTS

| | | |
|---|---|---|
| EP | 1 223 748 | 7/2002 |
| KR | 2001-0045333 | 6/2001 |

* cited by examiner

(n−1)_th field   n_th field   (n+1)_th field

METHOD AND APPARATUS FOR DE-INTERLACING VIDEO SIGNAL

CROSS-REFERENCE TO RELATED APPLICATIONS

This application claims the benefit of Korean Application No. 2002-87148, filed Dec. 30, 2002, in the Korean Intellectual Property Office, the disclosure of which is incorporated herein by reference.

BACKGROUND OF THE INVENTION

1. Field of the Invention

The present invention relates to an image format conversion system, and more particularly to a three-dimensional de-interlacing method and apparatus for converting an interlaced scan format into a progressive scan format.

2. Description of the Related Art

Generally, in the MPEG-2 standard, there are two scan formats: an interlaced scan format and a progressive scan format. In an encoder (not shown) and a decoder, situations can arise where it is necessary to convert an interlaced scan format video signal into a progressive scan format video signal. Such a scan format conversion is referred to as de-interlacing or Interlaced-to-Progressive Conversion (IPC).

Figure 1:
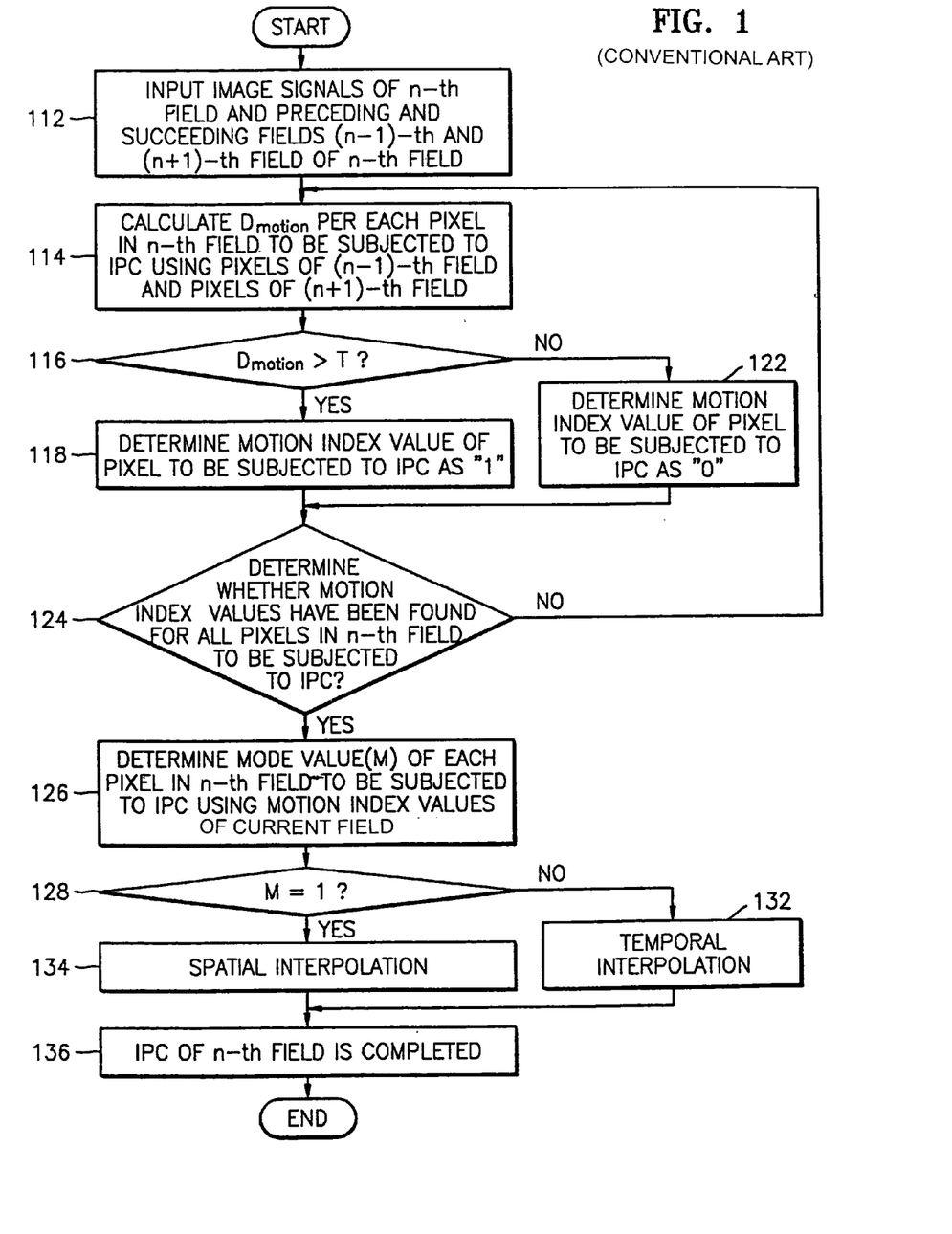
FIG. 1 is a flow chart of a conventional three-dimensional de-interlacing.
Figure 2:
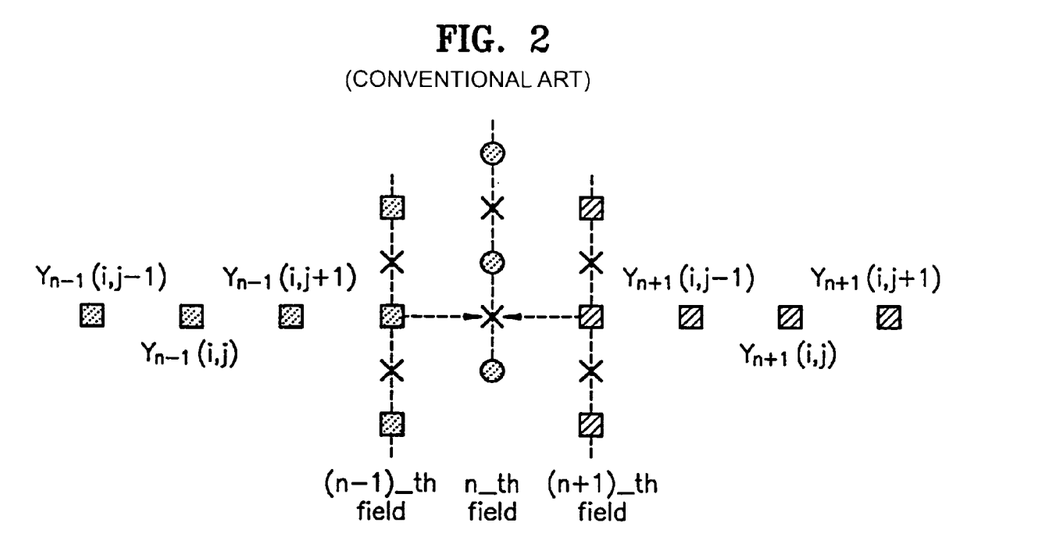
FIG. 2 is a conventional conceptual image field scheme for determining a motion index value of a pixel in a current field.

FIG. 1 is a flow chart illustrating a conventional three-dimensional de-interlacing method. All operations for de-interlacing are generally performed on each pixel unit of an image field of an interlaced image frame. For example, it is assumed that IPC is performed at a position (i, j) of an n-th field, as shown in FIG. 2. In this case, a pixel at the position (i, j) of the n-th field is referred to as $Y_n(i, j)$.

At operation 112, image signals corresponding to the n-th field to be subjected to IPC and preceding and succeeding fields ((n−1)-th and (n+1)-th fields) of the n-th field are input. Subsequently, as shown in FIG. 2, at operation 114, a difference value $D_{motion}$ between the pixel of the (n−1)-th field and the pixel of the (n+1)-th field is calculated. Conventionally, the difference value $D_{motion}$ between the pixels is determined from pixels $Y_{n-1}(i, j)$ and $Y_{n+1}(i, j)$ located at the preceding and succeeding positions of $Y_n(i, j)$ and the pixels $Y_{n-1}(i, j+1)$, $Y_{n-1}(i, j+1)$, $Y_{n+1}(i,j-1)$ and $Y_{n+1}(i, j+1)$ located at the horizontally left and right positions of the pixels $Y_{n-1}(i, j)$ and $Y_{n+1}(i, j)$, using the following Equation 1.

$$D_{motion} = \frac{1}{3} \sum_{k=-1}^{1} |Y_{n-1}(i, j+k) - Y_{n+1}(i, j+k)| \quad (1)$$

Subsequently, at operation 116, the difference value $D_{motion}$ is compared with a predetermined threshold value T. If the difference value $D_{motion}$ is greater than the predetermined threshold value T, at operation 118, it is considered that the pixel $Y_n(i, j)$ has moved and accordingly a motion index value $M_n(i, j)$ is determined as "1". On the other hand, if the difference value $D_{motion}$ is smaller than the threshold value T, at operation 122, it is considered that the pixel $Y_n(i, j)$ has not moved and accordingly the motion index value $M_n(i, j)$ is determined as "0".

Figure 3:
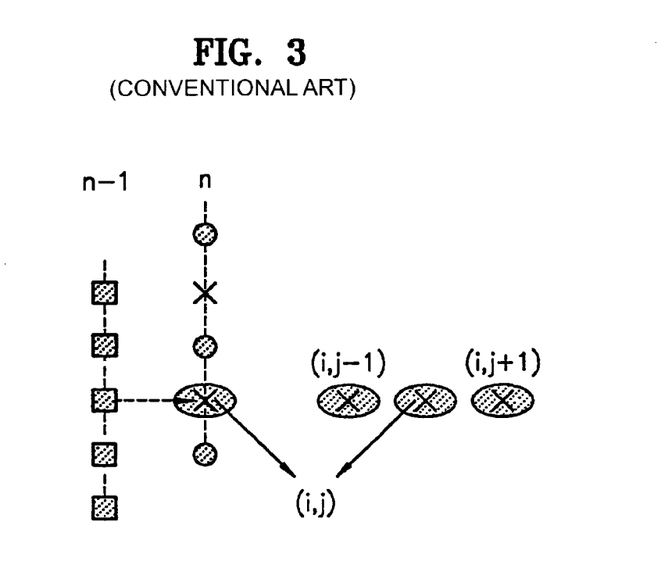
FIG. 3 is a conventional conceptual image field scheme for determining a motion mode value of a pixel in a current field.

In operation 124, it is determined whether the motion pixel values have been found for all the pixels in the n-th field to be subjected to IPC. Subsequently, if determined, at operation 124, that the motion index values for all the pixels in the n-th field to be subjected to IPC have been determined, at operation 126, a mode value M of each pixel in the nth field is finally determined using a motion index value of a pixel in the n-th field $Y_n(i, j)$, and using the motion index values of the pixels at the horizontally left and right positions (e.g., the pixels $Y_n(i, j\pm1)$) of the pixel $Y_n(i, j)$. That is, as shown in FIG. 3, for example, the mode value M of $Y_n(i, j)$ is calculated using Equation 2 below.

$$M = \sum_{k=-1,+1} M_{n-1}(i+k, j) + \sum_{k=-1,0,+1} M_n(i, j+k) \quad (2)$$

In operation 128, if the mode value M of $Y_n(i, j)$ is "0", it is determined that $Y_n(i, j)$ is in a stop mode. On the other hand, if the mode value M of $Y_n(i, j)$ is not "0", it is determined that $Y_n(i, j)$ is in a motion mode. Subsequently, if determined at operation 128 that the mode value M of $Y_n(i, j)$ is in the stop mode, at operation 132, a pixel value is output to which a temporal interpolation method is applied using an average of two temporally adjacent pixels. On the other hand, if determined at operation 128 that the mode value M of $Y_n(i, j)$ is in the motion mode, at operation 134, a pixel value is output to which a spatial interpolation method is applied using an edge direction value. Subsequently, at operation 136, the IPC is completed on all pixels of the n-th field to be subject to IPC and the same process is performed on the next field.

However, conventionally, as shown in FIG. 1 operation 126, only the motion information of three pixels (i.e., a current pixel and two pixels at the horizontally left and right positions of the current pixel) are used to determine the motion index value. Therefore, at operation 114, sufficient motion information may not be reflected. In particular, the conventional IPC method cannot provide a robust threshold value T to detect images having a few motions as well as images having many motions, because sufficient motion information is not reflected at operation 114.

SUMMARY OF THE INVENTION

Therefore, the present invention provides a de-interlacing method and apparatus which can strongly/confidently determine a motion mode even in areas having no motion as well as in areas having motions by performing IPC using motion index values determined from two-dimensional low pass filtered pixel values.

Additional aspects and advantages of the invention will be set forth in part in the description which follows and, in part, will be obvious from the description, or may be learned by practice of the invention.

The present invention may be achieved by a de-interlacing method which converts an interlaced format into a progressive format comprising performing low pass filtering on respective predetermined pixels of a current frame and a previous frame; comparing a threshold value to a difference value of the respective filtered pixels, and determining motion index values of respective pixels in a current field to be subjected to de-interlacing and of respective temporally and spatially adjacent pixels of the respective pixels in the current field; determining a motion mode of the respective pixels in the current field based upon the determined motion index values; and selectively performing spatial interpolation and temporal interpolation on the respective pixels in the current field according to the determined motion mode.

The present invention may be also achieved by a de-interlacing apparatus converting an interlaced format into a progressive format, the de-interlacing apparatus comprising a spatial interpolation unit spatially interpolating a pixel of a current frame along detected edge directions of the pixel at respective pixels; a temporal interpolation unit interpolating a pixel of the current frame by averaging the pixel of the current frame and a pixel of a previous frame; a motion index value determination unit two-dimensional low pass filtering the pixel of the current frame and a pixel of a frame delayed by one frame from the current frame, obtaining a difference value between the filtered pixel of the current frame and the filtered pixel of the delayed frame, and comparing the difference value with a threshold value to determine a motion index value of a pixel in a current field of the current frame; and a motion mode determination unit determining a motion mode of the current field pixel based upon motion index values of pixels of the current field and adjacent pixels of the current and previous fields to the current field detected by the motion index value determination unit, and selecting the spatial interpolating unit and the temporal interpolation unit according to the motion mode of the current field pixel.

BRIEF DESCRIPTION OF THE DRAWINGS

The above and/or other aspects and advantages of the present invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 4:
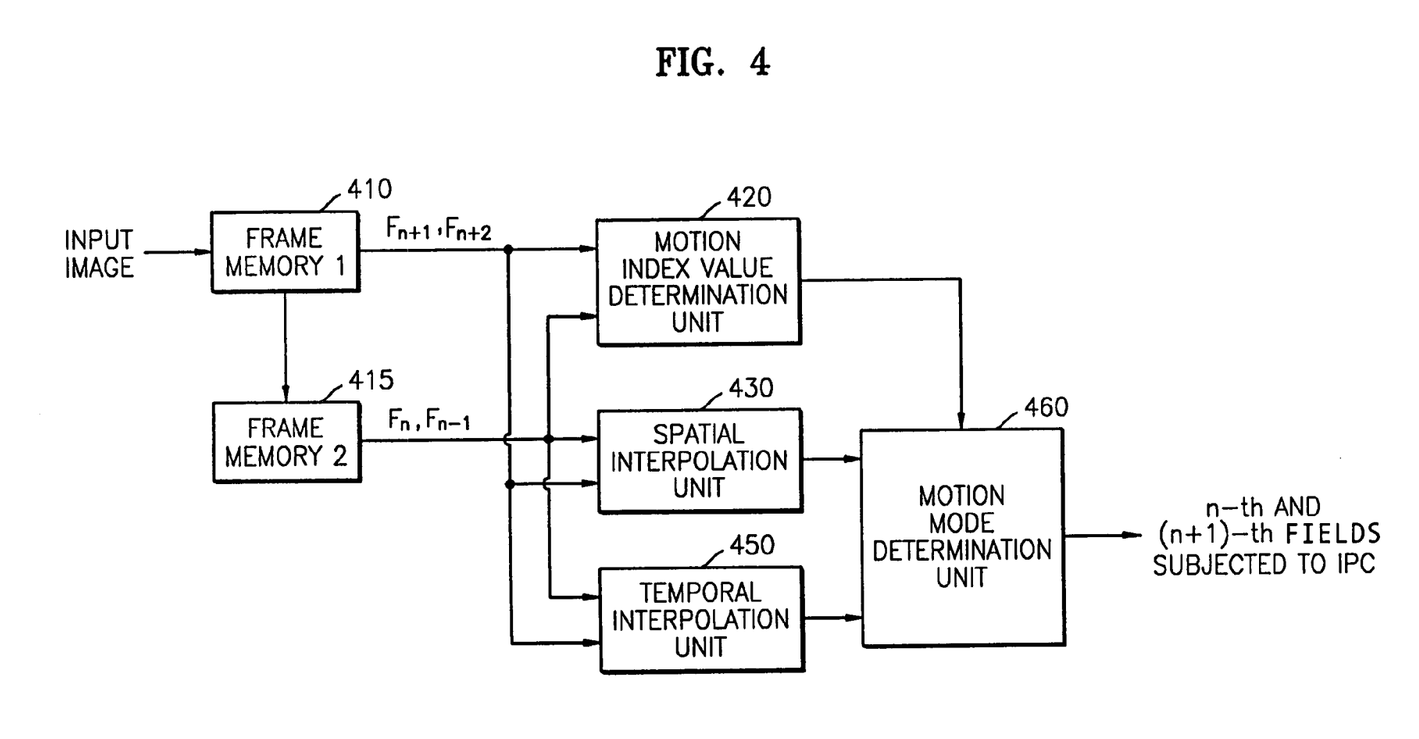
FIG. 4 is a functional block diagram of a three-dimensional de-interlacing apparatus, according to an embodiment of the present invention.

FIG. 4 is a functional block diagram of a three-dimensional de-interlacing apparatus, according to an embodiment of the present invention. With reference to FIG. 4, first and second frame memories 410 and 415 store an input image signal in image field units of an image frame. In particular, the present invention uses sequence of fields of two adjacent interlaced image frames (i.e., use a current image frame and a previous image frame). For example, the first frame memory 410 stores a succeeding (n+1)-th field $F_{n+1}$ and a succeeding (n+2)-th field $F_{n+2}$ to a current nth field $F_n$ (i.e., a current frame) and the second frame memory 415 stores a preceding (n−1)-th field $F_{n-1}$ to the current nth field $F_n$ and stores the current n-th field $F_n$ (i.e., a previous frame). Accordingly, by storing the previous and current image frames, IPC can be performed on the n-th field and (n+1)-th field using the image signals stored in the first frame memory 410 and second frame memory 415.

A motion index value determination unit 420 performs two-dimensional low pass filtering on pixels pm1 of succeeding fields $F_{n+1}$ and $F_{n+2}$ to the current field $F_n$ (i.e., pixels of a current image frame) and on pixels pm2 of a preceding field $F_{n-1}$ to the current field $F_n$ and the current field $F_n$ (i.e., pixels of a previous image frame delayed by one frame from the current image frame), obtains a difference value $D_{motion}$ of the filtered pixels cm1 and cm2, and compares the difference value $D_{motion}$ with a threshold value T to thereby determine motion index values of a current line in a field.

A spatial interpolation unit 430 performs spatial interpolation of the pixels based on edge direction values detected at respective pixel positions in the n-th field $F_n$ and the (n+1)-th field $F_{n+1}$. A temporal interpolation unit 450 obtains an average value with respect to each pixel of the current frame and the corresponding pixel of the previous frame.

A motion mode determination unit 460 determines a motion mode on each pixel in the current and previous image frames using all the motion index values of the current pixel and peripheral pixels detected from the motion index value determination unit 420, and selects one between the output of the spatial interpolation unit 430 and the output of the temporal interpolation unit 450 on the basis of the motion mode. As a result, the motion mode determination unit 460 can output the image signals of the n-th field $F_n$ and (n+1)-th field $F_{n+1}$ subjected to IPC.

Figure 5:
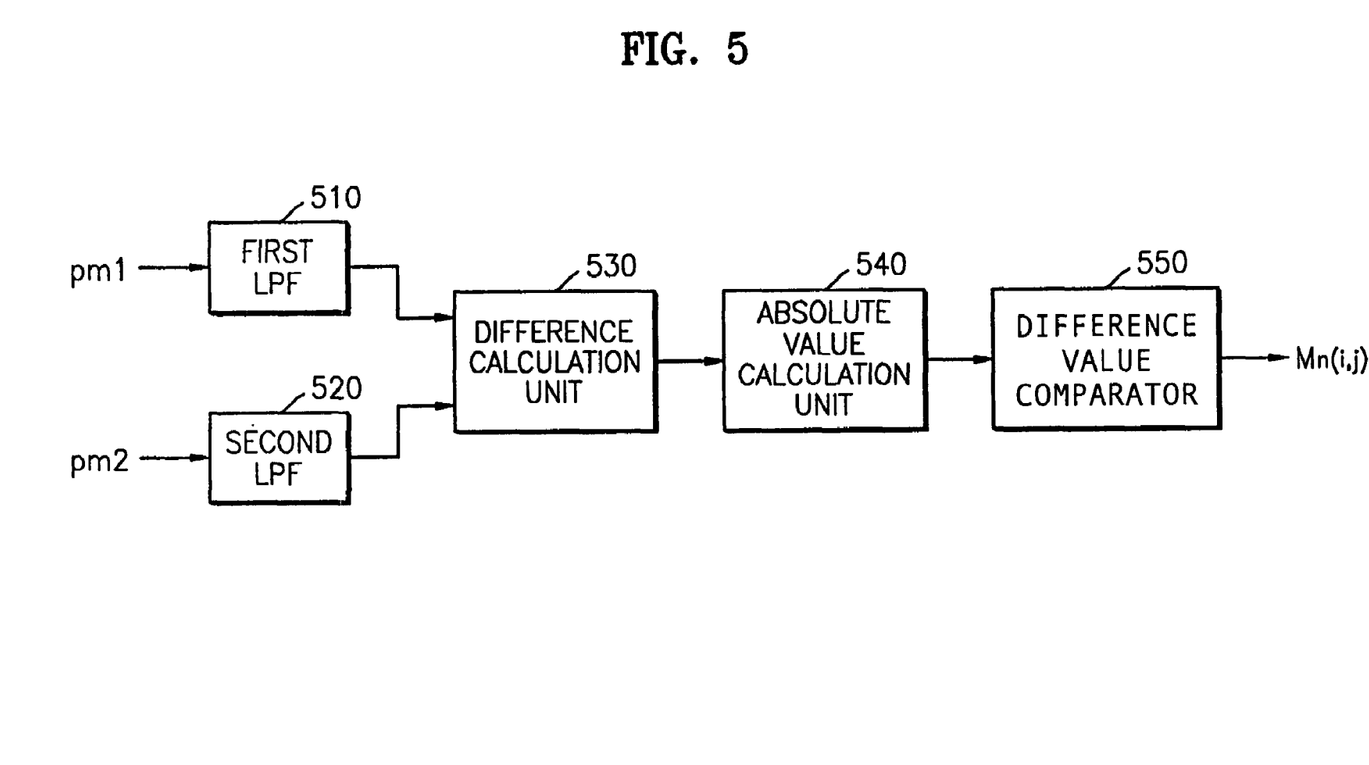
FIG. 5 is a detailed functional block diagram of a motion index value determination unit shown in FIG. 4.

FIG. 5 is a detailed functional block diagram of the motion index value determination unit 420 shown in FIG. 4. With reference to FIG. 5, if the frame memory 410 is storing succeeding fields $F_{n+1}$ and $F_{n+2}$ to the current field $F_n$ subject to IPC and the frame memory 415 is storing a preceding field $F_{n-1}$ to the current field $F_n$ and storing the current filed $F_n$, a first low-pass filter 510 performs two-dimensional low pass filtering on each pixel pm1 of the succeeding fields $F_{n+1}$ and $F_{n+2}$ to the current field $F_n$. A second low-pass filter 520 performs two-dimensional low pass filtering on each pixel pm2 of the preceding field $F_{n-1}$ and the current field $F_n$ at the spatially same position as each pixel pm1. The first and second low pass filters 510 and 520 output weighted averaging pixel values for respective pixels within predetermined areas.

A difference calculation unit 530 obtains a difference value between the pixel value cm1 output from the first low pass filter 510 and the pixel value cm2 output from the second low pass filter 520. An absolute value calculation unit 540 obtains the absolute value of the difference value from the difference calculation unit 530. A difference value comparator 550 compares a difference value obtained from the absolute value calculation unit 540 with a threshold value to determine the motion index values of the respective pixels of the nth field $F_n$. That is, the difference value comparator 550 determines that a motion exists in a pixel $F_n(i, j)$, if the calculated cm1-cm2 difference value is equal to or greater than the threshold value, and accordingly determines that a motion index value of the corresponding pixel is "1". On the other hand, the difference value comparator 550 determines that no motion exists in the pixel $F_n(i, j)$, if the calculated cm1-cm2 difference value is smaller than the threshold value, and accordingly determines that the motion index value of the corresponding pixel is "0".

Figure 6:
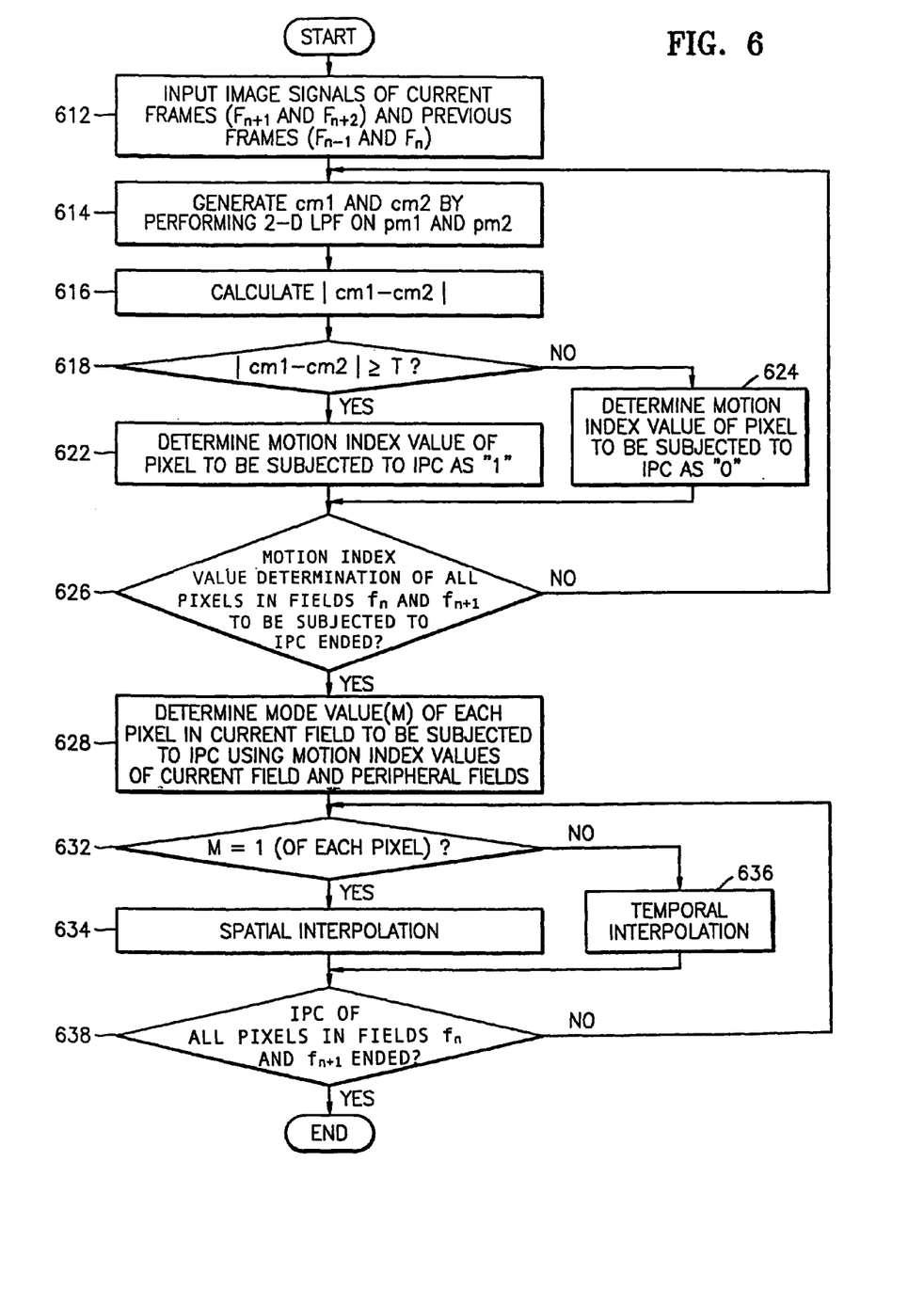
FIG. 6 is a flow chart of a three-dimensional de-interlacing method, according to an embodiment of the present invention.

FIG. 6 is a flow chart of a three-dimensional de-interlacing method, according to an embodiment of the present invention. All operations for de-interlacing are performed on the basis of a luminance component of each pixel. As an example, with reference to FIG. 4, a field pixel subject to IPC is defined as a pixel at a position (i, j) of an n-th field and the succeeding fields $F_{n+1}$ and $F_{n+2}$ and the preceding field $F_{n-1}$ to the current field $F_n$ are used to detect motion at the pixel $F_n(i, j)$. At operation 612, image signals of succeeding fields $F_{n+1}$ and $F_{n+2}$ to the current field $F_n$ (i.e., a current image frame) and a preceding field $F_{n-1}$ to the current field $F_n$ and the current field $F_n$ (i.e., a previous image frame) are input. More particularly, for example, at operation 612, the IPC is performed on the n-th field $F_n$. Accordingly, at operation 612, two pixel values at the temporally front and back positions of the pixel $F_n(i, j)$ to be subjected to IPC are output, which are a succeeding pixel pm1 (i.e., a succeeding pixel $F_{n+1}(i, j)$ to the current field is output as pm1), and a preceding pixel pm2 (i.e., a preceding pixel $F_{n-1}(i, j)$ to the current field is output as pixel pm2).

Subsequently, at operation 614, the first output pixel pm1 and second output pixel pm2 are used to generate the first filter output value cm1 and the second filter output value cm2, respectively, according to the two-dimensional low pass filtering of the low pass filters 510 and 512. For example, the two-dimensional low pass filtering may be achieved by weighted averaging, that is, a method of obtaining an average by multiplying the values of the pixels within a predetermined window area extended horizontally and vertically centering on the current pixel $F_n(i, j)$ by a predetermined filter coefficient. Such low pass filtering is performed on the first output pixel pm1 and second output pixel pm2. Here, typically, the first filter output value cm1 is calculated using Equation 3 below.

$$cm1 = \sum_{l=-1,0,1} \omega_{0,l} F_{n+1}(j, j+1) + \sum_{k=-1,1} \sum_{l=-1,0,1} \omega_{k,l} F_{n+2}(i+k, j+l) \quad (3)$$

Herein, typically, the second filter output value cm2 is calculated using Equation 4 below.

$$cm2 = \sum_{l=-1,0,1} \omega_{0,l} F_{n-1}(j, j+1) + \sum_{k=-1,1} \sum_{l=-1,0,1} \omega_{k,l} F_n(i+k, j+l) \quad (4)$$

In Equations 3 and 4 above, $\omega_{k,l}$ is the filter coefficient within the predetermined area for the two-dimensional low pass filtering, for example, within a 3×3 area. At operation 616, the difference calculation unit 530 obtains the difference between the first filter output value cm1 and the second filter output value cm2. Further, at operation 616, after obtaining the difference between the first filter output value cm1 and the second filter output value cm2, the absolute value calculation unit 540 calculates the absolute value of the difference, which will be referred to as $D_{motion}$.

At operation 618, the difference value comparator 550 compares the difference value $D_{motion}$ with a threshold value T to output a motion index value for the pixel $F_n(i, j)$ subject to IPC. If, at operation 618, the difference value $D_{motion}$ is equal to or greater than the threshold value T, it is determined that the pixel $F_n(i, j)$ to be subjected to IPC is moved. Accordingly, at operation 622, a motion index value $M_n(i, j)$ of the pixel $F_n(i, j)$ is determined as "1". On the other hand, if, at operation 618, the difference value $D_{motion}$ is smaller than the threshold value T, it is determined that the pixel $F_n(i, j)$ is not moved. Accordingly, at operation 624, the motion index value $M_n(i, j)$ of the pixel $F_n(i, j)$ is determined as "0". More particularly, at operation 626, it is determined if the difference values $D_{motion}$ have been obtained for all pixels in $F_n$ to be subjected to IPC and compared with the threshold value T to thereby obtain the motion index values of all $F_n$ pixels. Subsequently, operations 614 through 626 are repeated for all the pixels in the field $F_{n+1}$ to be subjected to IPC.

Subsequently, after the motion index values of all pixels in $F_n$ and $F_{n+1}$ to be subjected to IPC are determined, at operation 628, a motion mode value M of each pixel $F_n(i, j)$ to be subjected to IPC is determined using the motion index values of the field $F_n$ and peripheral fields thereof. For example, typically, IPC is performed on a bottom field of a first image frame and a top field of a second image frame in a pixel line sequence of each field after reading two adjacent image frames.

Figure 7:
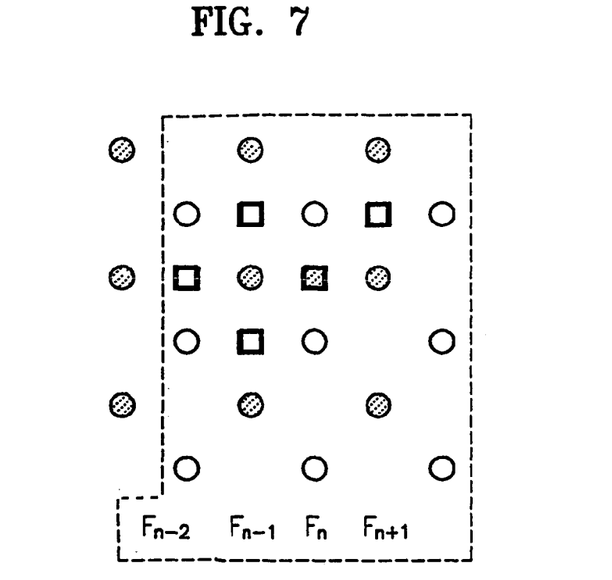
FIG. 7 shows pixel motion index values used for determining a motion mode value of a pixel in a current field, according to an embodiment of the present invention.

FIG. 7 shows pixel motion index values used for determining a motion mode value of a pixel in a current field (i.e., $F_n(i, j)$), according to an embodiment of the present invention. In particular, with reference to FIG. 7, as another example, the preceding fields $F_{n-1}$ and $F_{n+2}$ to the current field $F_n$ and the succeeding field $F_{n+1}$ to the current field $F_n$ are used as the sequence of image fields in two input adjacent interlaced image frames (i.e., the IPC is performed on the field $F_{n+1}$ as the current field $F_n$ with respect to the previously processed field $F_n$). With reference to FIG. 7, dark circles denote the pixels of the top field and white circles denote the pixels of the bottom field. For convenience, the pixels of a vertical component are shown in a time direction. In FIG. 7, the fields to be subjected to IPC are the fields $F_n$, and $F_{n+1}$, and using the field $F_n$ as an example, the pixel to be presently subjected to IPC is the pixel at a dark square position (i, j) of the field $F_n$. The motion mode value M of the dark square pixel $F_n(i, j)$ to be subjected to IPC is determined using the motion index value of the subject pixel $F_n(i, j)$ and the motion index values at white square positions of $F_{n-2}$, $F_{n-1}$ and $F_{n+1}$. Here, all the motion index values of the past fields $F_{n-2}$ and $F_{-1}$ are pre-stored in a particular storage, such as the frame memories 410 or 415. Also, the motion mode values of an upper line of the line to be subjected to IPC are temporally pre-obtained values. Thus, the motion mode value M of $F_n(i, j)$ is represented using all of motion index values $M_n(i, j)$ and $M_n(i, j\pm1)$ of the pixels in $F_n$, the motion index values (that is, $M_{n+1}(i-1, j)$ and $M_{n+1}(i-1, j\pm1)$) of the temporally and spatially nearest pixels to $F_n(i, j)$ from among the pixels in $F_{n+1}$, the motion index values (that is, $M_{n-1}(j\pm1,j)$ and $M_{n-1}(i\pm1, j\pm1)$) of the temporally and spatially nearest pixel to $F_n(i, j)$ from among the pixels in $F_{n-1}$, and finally the motion index values (that is, $M_{n-2}(i, j)$ and $M_{n-2}(i, j\pm1)$) of the temporally and spatially nearest pixels to $F_n(i, j)$ from among the pixels in $F_{n-2}$, according to the following Equation 5.

$$M = \sum_{k=-1}^{1} \{M_n(i, j+k) + M_{n+1}(i-1, j+k) + \quad (5)$$
$$M_{n-1}(i-1, j+k) + M_{n-1}(i+1, j+k) + M_{n-2}(i, j+k)\}$$

According to another embodiment of the present invention, the motion mode value M can be calculated using some of the motion index values from among the 15 motion index values used in Equation 5 or using additional motion index values under some conditions. For example, if a sum of the motion index value of the current pixel $F_n(i, j)$ and the motion index values of temporally and spatially adjacent pixels of the current pixel $F_n(i, j)$ is "0", the motion mode of the $F_n(i, j)$ is determined to be a stop mode, and if the sum is not "0", the motion mode of the $F_n(i, j)$ is determined to be a motion mode.

With reference to FIG. 6, at operation 632, if the motion mode value M, which is determined at operation 628, is "0", it is determined that $F_n(i, j)$ is in a stop mode, and on the other hand if, at operation 632, the motion mode value M is not "0", it is determined that $F_n(i, j)$ is in a motion mode. Subsequently, if determined at operation 632 that $F_n(i, j)$ is in the stop mode, at operation 636, a pixel value is output to which a temporal interpolation method using an average value of two adjacent pixels is applied. On the other hand, if determined at operation 632 that $F_n(i, j)$ is in the motion mode, at operation 634, a pixel value is output to which a spatial interpolation method using edge direction values is applied. In particular, the motion mode determination unit 460 performs operation 632 according to the output pixel motional index value from the index value determination unit 420 (i.e., the difference value comparator 550), and the output pixel values from the spatial and temporal interpolation units 430 and 450 as the case may be.

At operation 638, it is determined whether IPC of all pixels in the current field $F_n$ has been performed. Accordingly, operations 632 through 634 are repeated to perform IPC for each pixel in the current field $F_n$. In this way, by adaptively performing the temporal interpolation method and the spatial interpolation method based upon the motion mode value M with respect to all pixels in $F_n$ to be subjected to IPC, at operation 638, all luminance components of pixel values to be finally interpolated can be output. Operations 628 through 638 are also applied in the same manner to all the pixels in $F_{n+1}$ to be subjected to IPC. As a result, in contrast to the conventional IPC method of FIG. 1, according to the IPC method of the present invention it is possible to strongly/confidently determine the motion mode of a pixel even in the areas having no motion as well as in the areas having motions, by low-pass filtering each field pixel, and using a greater number of pixel motion index values than conventionally used (i.e., by using pixel motion index values in sequence of fields of two adjacent interlaced image frames, such as determining a motion mode of a subject pixel based upon the determined motion index values of temporally and spatially adjacent pixels to the subject pixel).

Figure 8:
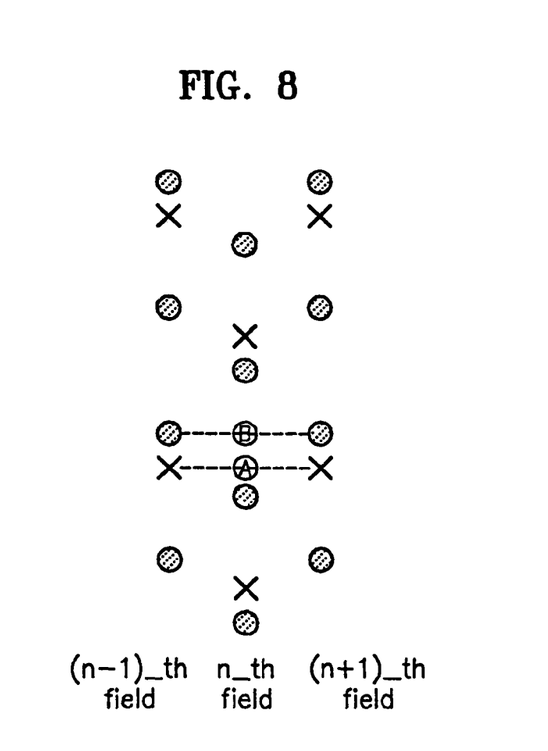
FIG. 8 shows example locations of YUV components of pixels in a 4:2:0 interlaced image format for performing a three-dimensional IPC on a UV pixel component in the 4:2:0 interlace image format, according to an embodiment of the present invention.

FIG. 8 shows example locations of YUV components of pixels in a 4:2:0 interlaced image format for performing a three-dimensional IPC on a UV (color) pixel component in the 4:2:0 interlace image format, according to an embodiment of the present invention. In particular, according to another embodiment of the present invention, a method of performing a three-dimensional IPC on a UV (color) component in a 4:2:0 YUV image signal is provided. That is, spatial interpolation and temporal interpolation are selectively used by detecting motions of the UV (color) components of pixels similar to detecting motions in the Y (luminance) components of pixels. However, because the UV (color) components of pixels has a very small change, the motion mode determination using the motion index values of the UV (color) components of the pixels may generate an error. According to the present invention, the motion modes of the UV (color) components of pixels are determined using the motion mode values obtained from the Y (luminance) components of pixels.

FIG. 8 shows the locations of the YUV components of pixels in a 4:2:0 interlaced image. The parts denoted by circles represent the Y components, and the parts denoted by X represent the UV components. In FIG. 8, it is assumed that the UV component of the pixel at a position A of an n-th bottom field is de-interlaced. According to the present invention, the motion mode value of a Y component at a position B is used instead of the motion mode value of the UV component at the position A. Because the mode value of the Y component is reliable and the distance between the positions A and B is also very small, the motion mode determination method of the present invention is useful. IPC of the UV components of pixels at other positions is also performed in the same manner. Accordingly, if the motion mode value of the Y component of a pixel to be subjected to IPC is "0", temporal interpolation is performed on the UV component of the pixel of the n-th bottom field to be de-interlaced. On the other hand, if the motion mode value of such Y component is not "0", an average value of adjacent pixels above and below in a 90° direction is obtained (i.e., a spatial interpolation having a 90° direction is performed on the UV component of the pixel of the n-th bottom field to be de-interlaced). In particular, if the motion mode value of the Y component of the pixel is not "0", because the UV components of pixels have a small motion, a directional interpolation as in the Y components of pixels can be difficult. Also, because there are many possibilities that the direction of the Y component and the direction of the UV component are different to each other when trying to use a directional value of the Y component, a simple spatial interpolation having a 90° direction is performed on the UV components of the pixel of the n-th bottom field to be de-interlaced. Accordingly, the present invention provides a de-interlacing method of replacing the motion mode of a color difference component of a current pixel $F_n(i, j)$ with the motion mode of a luminance component of the current pixel $F_n(i, j)$; and obtaining an output value of the color difference component of the current pixel $F_n(i, j)$ by interpolating two adjacent pixels on a temporal axis, if determined that the motion mode value of the luminance component is a stop mode, and obtaining an output value of the color difference component of the current pixel $F_n(i, j)$ by spatially interpolating in a 90° direction the color difference component of the current pixel $F_n(i, j)$, if determined that the motion mode value of the luminance component is a motion mode.

The present invention may be embodied in a general purpose digital computer by running a program from a computer readable medium, including but not limited, to storage media such as magnetic storage media (e.g. ROM's, floppy disks, hard disks, etc.) and optically readable media (e.g., CD-ROMs, DVDs, etc.) The present invention may be embodied as a computer readable medium having a computer readable program code unit embodied therein for causing a number of computer systems connected via a network to effect distributed processing according to the processes of the invention as shown in FIG. 6. More particularly, the processes of the present invention as embodied in the functional block units of FIGS. 4 and 5, and as shown in FIG. 6, are implemented using software and/or computing hardware.

As described above, in accordance with the present invention, it is possible to strongly/confidently determine a motion mode even in areas having no motion as well as in areas having motions by performing de-interlacing using motion index values determined from two-dimensional low pass filtered pixel values. More particularly, the present invention provides a three-dimensional image de-interlacing processor and method converting an interlaced scan format image into a progressive scan format image by performing low pass filtering on respective predetermined pixels of a current frame and a previous frame, and determining pixel motion index values by comparing a threshold value to a difference value between the respective filtered pixels in a current field in one of the current and previous frames and corresponding respective filtered pixels in preceding and succeeding fields to the current field and in the current and previous frames. A motion mode of a pixel is determined based upon the determined motion index values of temporally and spatially adjacent pixels to the pixel. A spatial interpolation or temporal interpolation on the subjected pixel can be selected depending on the determined motion mode.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A de-interlacing method of converting an interlaced format into a progressive format comprising:
    performing low pass filtering on respective predetermined pixels of a current frame and a previous frame;
    comparing a threshold value to a difference value between the respective filtered pixels in a current field to be subjected to de-interlacing in one of the current and previous frames and corresponding respective filtered pixels in preceding and succeeding fields to the current field and in the current and previous frames;
    determining motion index values of the respective pixels in the current and previous frames based upon the comparing;
    determining a motion mode of a pixel subject to the de-interlacing in the current field based upon the determined motion index values of temporally and spatially adjacent pixels to the current field pixel, in the preceding and succeeding fields to the current field and in the current and previous frames; and
    selectively performing spatial interpolation and temporal interpolation on the current field pixel according to the determined pixel motion mode.

2. The de-interlacing method of claim 1, wherein the low pass filtering is performed by weighted averaging in which an average is obtained by multiplying a predetermined filter coefficient and values of the pixels within a window having a predetermined vertical and horizontal size centering on a respective pixel subject to the filtering.

3. The de-interlacing method of claim 1, wherein the current field subject to de-interlacing is an n-th field and a current pixel at a position (i, j) within the n-th field is $F_n$ (i, j), and
    the method further comprises:
    determining the motion index value $M_n$(i, j) of the current pixel $F_n$ (i, i) as 1, if the difference value is equal to or greater than the threshold value, and
    determining the motion index value $M_n$(i, j) of the current pixel $F_n$ (i, i) as 0 if the difference value is less than the threshold value.

4. The de-interlacing method of claim 1,
    wherein the current field subject to de-interlacing is an n-th field and a current pixel at a position (i, j) within the n-th field is $F_n$ (i, j), and $M_n$(i, j) is the determined motion index value of $F_n$ (i, j), and
    wherein the motion mode value of the current pixel $F_n$ (i, j) is determined by $$M = \sum_{k=-1}^{1} \{M_n(i, j+k) + M_{n+1}(i-1, j+k) + M_{n-1}(i-1, j+k) + M_{n-1}(i+1, j+k) + M_{n-2}(i, j+k)\}.$$

5. The de-interlacing method of claim 1,
    wherein the current field subject to de-interlacing is an n-th field and a current pixel at a position (i, j) within the n-th field is $F_n$ (i, j), and
    wherein if a sum of the motion index value of the current pixel $F_n$ (i, j) and the motion index values of temporally and spatially adjacent pixels of the current pixel $F_n$ (i, j) is "0", the motion mode of the $F_n$ (i, j) is a stop mode, and if the sum is not "0", the motion mode of the $F_n$ (i, j) is a motion mode.

6. The de-interlacing method of claim 1,
    wherein the current field subject to de-interlacing is an n-th field and a current pixel at a position (i, j) within the n-th field is $F_n$ (i, j), and
    wherein the temporal interpolation is applied to the current pixel $F_n$ (i, j), if determined that the motion mode of the current pixel $F_n$ (i, j) is a stop mode and the spatial interpolation is applied to the current pixel $F_n$ (i, j), if determined that the motion mode of the current pixel $F_n$ (i, j) is a motion mode.

7. The de-interlacing method of claim 1,
    wherein the current field subject to de-interlacing is an n-th field and a current pixel at a position (i, j) within the n-th field is $F_n$ (i, j), and
    the method further comprises:
    replacing the motion mode of a color difference component of the current pixel $F_n$ (i, j) with the motion mode of a luminance component of the current pixel $F_n$ (i, j); and
    obtaining an output value of the color difference component of the current pixel $F_n$ (i, j) by interpolating two adjacent pixels on a temporal axis, if determined that the motion mode value of the luminance component is a stop mode, and obtaining an output value of the color difference component of the current pixel $F_n$ (i, j) by spatially interpolating in a 90° direction the color difference component of the current pixel $F_n$ (i, j), if determined that the motion mode value of the luminance component is a motion mode.

8. The de-interlacing method of claim 1, wherein the low pass filtering on a pixel is performed according to:

$$cm1 = \sum_{l=-1,0,1} \omega_{0,l} F_{n+1}(j, j+1) + \sum_{k=-1,1} \sum_{l=-1,0,1} \omega_{k,l} F_{n+2}(i+k, j+l).$$

9. The de-interlacing method of claim 1, wherein the low pass filtering on a pixel is performed according to:

$$cm2 = \sum_{l=-1,0,1} \omega_{0,l} F_{n-1}(j, j+1) + \sum_{k=-1,1} \sum_{l=-1,0,1} \omega_{k,l} F_n(i+k, j+l).$$

10. A de-interlacing apparatus converting an interlaced image format into a progressive image format, the de-interlacing apparatus comprising:
a spatial interpolation unit which spatially interpolates a pixel in a current frame along detected edge directions of the pixel at respective pixels in the current frame;
a temporal interpolation unit which interpolates a pixel in the current frame by averaging the pixel of the current frame and a corresponding pixel of a previous frame;
a motion index value determination unit which performs two-dimensional low pass filtering on respective predetermined pixels of the current frame and the previous frame, obtains a difference value between the respective filtered pixels in a current field subject to de-interlacing in one of the current and previous frames and corresponding respective filtered pixels in preceding and succeeding fields to the current field and in the current and previous frames, and compares the difference value with a threshold value to determine motion index values of the respective pixels in the current and previous frames; and
a motion mode determination unit which determines a motion mode of a pixel subject to the de-interlacing in the current field based upon the determined pixel motion index values of temporally and spatially adjacent pixels to the current pixel, in the preceding and succeeding fields to the current field and in the current and previous frames, and selects the spatial interpolation unit and temporal interpolation unit to interpolate the current field pixel according to the determined pixel motion mode.

11. The de-interlacing apparatus of claim 10, wherein the motion index value determination unit comprises:
a first low pass filter which performs the two-dimensional low pass filtering on the respective pixels in the current frame;
a second low pass filter which performs the two-dimensional low pass filtering on the respective pixels in the previous frame;
a difference calculation unit which obtains the difference value according to a difference between a pixel value output from the first low pass filter and a pixel value output from the second low pass filter; and
a difference value comparator which compares the difference value calculated by the difference calculation unit with the threshold value, and determines the motion index value of a pixel in the current field.

12. The de-interlacing apparatus of claim 11, wherein the difference value comparator determines the motion index value of the current field pixel as 1, if the difference value is equal to or greater than the threshold value, and determines the motion index value of the current field pixel as 0, if the difference value is smaller than the threshold value.

13. The de-interlacing apparatus of claim 10, wherein the motion mode determination unit further:
replaces the motion mode of a color difference component of the current pixel $F_n$ (i, j) with the motion mode of a luminance component of the current pixel $F_n$ (i, j); and
obtains an output value of the color difference component of the current pixel $F_n$ (i, j) by interpolating two adjacent pixels on a temporal axis, if determined that the motion mode value of the luminance component is a stop mode, and obtaining an output value of the color difference component of the current pixel $F_n$ (i, j) by spatially interpolating in a 90° direction the color difference component of the current pixel $F_n$ (i, j), if determined that the motion mode value of the luminance component is a motion mode.

14. A de-interlacing image processor converting an interlaced image format into a progressive image format, comprising:
at least one computer readable medium embodied with a computer program de-interlacing the interlaced image format according to a process of:
interpolating a pixel of a current frame along detected edge directions of the pixel at respective current frame pixels;
interpolating a pixel of the current frame by averaging the pixel of the current frame and a pixel of a previous frame;
two-dimensional low pass filtering a pixel of the current frame and a pixel of a previous frame;
obtaining a difference value between the filtered pixel of the current frame and the filtered pixel of the previous frame;
comparing the difference value with a threshold value to determine a motion index value of the pixel in the current frame;
determining a motion mode of a pixel in a current field of the current frame based upon motion index values of pixels of the current field and adjacent peripheral pixels to the pixel, in the current and previous fields to the current field and in the current and previous frames; and
selecting the spatial interpolation and the temporal interpolation for the current field pixel according to the motion mode of the current field pixel.

15. A de-interlacing image processor converting an interlaced image format into a progressive image format, comprising:
a computer readable medium embodied with a computer program determining a motion mode of a pixel in a current interlaced image frame field by performing Interlaced-to-Progressive Conversion using motion index values determined from two-dimensional low pass filtered pixel values of a previous interlaced image frame and the current interlaced image frame.

16. The de-interlacing image processor of claim 15, wherein the computer program uses a sequence of fields in two adjacent interlaced image frames as preceding and succeeding fields to the current field in the previous and current image frames, and the motion mode of the pixel is determined based upon the motion index values of temporally and spatially adjacent pixels to the pixel, in the preceding and the succeeding fields to the current field and in the previous and current image frames.

* * * * *

UNITED STATES PATENT AND TRADEMARK OFFICE
CERTIFICATE OF CORRECTION

| | |
|---|---|
| PATENT NO. | : 7,265,791 B2 |
| APPLICATION NO. | : 10/670778 |
| DATED | : September 4, 2007 |
| INVENTOR(S) | : Byung-cheol Song et al. |

It is certified that error appears in the above-identified patent and that said Letters Patent is hereby corrected as shown below:

Column 10, Line 2, change "$F_n(i,i)$" to --$F_n(i,j)$--.

Column 10, Line 5, change "$F_n(i,i)$" to --$F_n(i,j)$--.

Signed and Sealed this

Eleventh Day of December, 2007

JON W. DUDAS
*Director of the United States Patent and Trademark Office*